US009156932B2

(12) United States Patent
Mruk et al.

(10) Patent No.: US 9,156,932 B2
(45) Date of Patent: *Oct. 13, 2015

(54) METHOD OF MAKING A GRAFT COPOLYMER (75) Inventors: Ralf Mruk, Lipperscheid (LU); Frank Schmitz, Bissen (LU); Robert Fokko Roskamp, Trier (DE); Alexandra Hermann, Mainz (DE); Rudolf Wilhelm Zentel, Nierstein (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 863 days.

This patent is subject to a terminal disclaimer.

(21) Appl. No.: 13/332,837

(22) Filed: Dec. 21, 2011

(65) Prior Publication Data
US 2013/0165588 A1 Jun. 27, 2013

(51) Int. Cl.
*C08F 220/56* (2006.01)

(52) U.S. Cl.
CPC .................................... *C08F 220/56* (2013.01)

(58) Field of Classification Search
CPC .................................................... C08F 220/56
USPC ........... 525/222, 232, 233, 242, 326.1, 328.2, 525/330.3, 374, 378
See application file for complete search history.

(56) References Cited

U.S. PATENT DOCUMENTS

| 4,772,506 | A | 9/1988 | Siol et al. | |
| 4,937,290 | A | 6/1990 | Bauer et al. | 525/184 |
| 6,486,213 | B1 | 11/2002 | Chen et al. | 514/772.1 |
| 7,847,019 | B2 | 12/2010 | David et al. | 525/54.1 |
| 8,759,451 | B2 * | 6/2014 | Mruk et al. | 525/222 |
| 2011/0224351 | A1 * | 9/2011 | Mori et al. | 524/458 |

FOREIGN PATENT DOCUMENTS

| CN | 1068124 | A | | 1/1993 | |
| CN | 1735633 | A | | 2/2006 | |
| CN | 102239194 | A | | 11/2011 | |
| DE | 10254432 | A1 | | 6/2004 | |
| EP | 0583814 | | | 2/1994 | C08G 81/02 |
| EP | 2345679 | A1 | | 7/2011 | |
| GB | 0629649 | | | 12/1994 | C08G 81/02 |
| JP | 60188411 | | | 8/1985 | B01D 65/100 |
| JP | 60188411 | | | 9/1985 | B01D 65/100 |
| JP | 2001-123018 | | | 5/2001 | |
| JP | 2011-184511 | | | 9/2011 | |
| WO | WO-2010038835 | A1 * | | 4/2010 | |

OTHER PUBLICATIONS

Willcock, H. et al. Polymer Chemistry vol. 1 (2010) pp. 149-157 published online Dec. 23, 2009.*
Lai, J.T. et al. Macromolecules vol. 35 (2002) pp. 6754-6756 published online Aug. 2, 2002.*
Goldmann, A.S. et al. Macromolecules vol. 42 (2009) pp. 3707-3714 published online Apr. 27, 2009.*
Gerber, R.Eric et al "β-Mercaptopropionitrile (2-Cyanoethanethiol)", Organic Synthesis Collective vol. 10 p. 234 (2004) John Wiley & Sons, New York, NY.*
Gerber, R.Eric et al "β-Mercaptopropionitrile (2-Cyanoethanethiol)", Organic Synthesis vol. 77 p. 186 (2000), John Wiley & Sons, New York, NY.*
Kryger, Matt, "Applications of Thiol-ENE Coupling", Abstract, Dec. 11, 2008, pp. 1-8, Retrieved from the Internet, http://www.chemistry.illinois.edu/research/organic/seminar_extracts/2008_2009/Matt_Kryger_Chem535 FA08_Abstract.pdf *whole document*.
Moad, Graeme et al., "Living Radical Polymerization by the RAFT Process", Australian J. Chemistry 2005, vol. 58, pp. 379-410, Retrieved from the Internet: URL: http://www.publish.csiro.au/journals/ajc *whole document*.
Gerber, R. Eric et al., β-Mercaptopropionitrile (2-Cyanoethanethiol), Organic Synthesis, vols. 10 and 77, pp. 234 and 186.
Brummelhuis, Niels ten et al., "Supporting Information to Thiol#Ene Modification of 1,2-Polybutadiene Using UV Light or Sunlight", pp. S1-S5.
Guowei Wang et al, Investigation of Thiol-ene Addition Reaction on Poly(isoprene) Under UV Irradiation: Synthesis of Graft Copolymers with "V"-Shaped Side Chains, Journal of Polymer Science Part A: Polymer Chemistry, Sep. 1, 2010, 3797-3806, vol. 48, No. 17.
Heribert Decher et al, New Amphiphilic Poly(butadiene)-graft-Poly(ethylene oxide)s, Polymer International, Nov. 1, 1995, 219-225, vol. 38, No. 3.
Wen-Fu Lee et al, Graft Copolymerization of N-Isopropylacrylamide on Styrene-Butadiene-Styrene Block Copolymer, Journal of Applied Polymer Science, Dec. 9, 2001, 2641-2650, vol. 82, No. 11.
EPO Search Report dated Feb. 19, 2013.
Wei Guanwei, Preparation of Poly(N-isopropylacrylamide)-grafted Pd Nanoparticle and Catalytic Properties Thereof, The Master Degree Dissertation of Nankai University, Nov. 24, 2010, pp. 20-21.
Chinese Search Report.
Kryger, Matt, "Applications of Thiol-ENE Coupling", Abstract, Dec. 11, 2008, pp. 1-8, Retrieved from the Internet, http://www.chemistry.illinois.edu/research/organic/seminar_extracts/2008_2009/Matt_Kryger_Chem535_FA08_Abstract.pdf *whole document*.
Moad, Graeme et al., "Living Radical Polymerization by the RAFT Process", Australian J. Chemistry 2005, vol. 58, pp. 379-410, Retrieved from the Internet: URL: http://www.publish.csiro.au/journal/ajc *whole document*.

(Continued)

Primary Examiner — Irina S Zemel
Assistant Examiner — Jeffrey Lenihan
(74) Attorney, Agent, or Firm — John D. DeLong (57) ABSTRACT

A method of making a graft copolymer, comprising the steps of obtaining a first polymer comprising at least one carbon-carbon double bond, the first polymer derived from at least one first monomer, the at least one first monomer comprising a conjugated diene monomer; obtaining a second polymer, the second polymer capable of exhibiting a lower critical solution temperature (LCST) and comprising a terminal functional group capable of reacting with the carbon-carbon double bond; and reacting the second polymer with the first polymer to form a graft copolymer, the graft copolymer comprising a backbone derived from the first polymer and sidechains derived from the second polymer.

15 Claims, 10 Drawing Sheets

(56) References Cited

OTHER PUBLICATIONS

Lutz, Jean-Francois, "Modular Chemical Tools for Advanced Macromolecular Engineering", *Polymer*, vol. 49, Issue 4, Feb. 18, 2008, pp. 817-824.

Harrisson, Simon, "Radical-Catalyzed Oxidation of Thiols by Trithiocarbonate and Dithioester RAFT Agents: Implications for the Preparation of Polymers with Terminal Thiol Functionality", *Macromolecules*, Jan. 13, 2009, Retrieved from the Internet: URL: http://www.pubs.acs.org *whole document*.

Brummelhuis, Niels ten et al., "Supporting Information to Thiol#Ene Modification of 1,2-Polybutadiene Using UV Light or Sunlight", pp. S1-S5, (2008).

Mori, Noriko, et al., "Temperature-Induced Changes in the Surface Wettability of SBR + PNIPA Films", *Macromolecular Materials and Engineering*, 2007, vol. 292, pp. 917-922, Retrieved from the Internet: URL: http://www.mme-journal.de *whole document*.

Brummelhuis, Niels ten et al., "Thiol#Ene Modification of 1,2-Polybutadiene Using UV Light or Sunlight", *Macromolecules*, 2008, 41, pp. 9946-9947, Retrieved from the Internet: URL: http://www.pubs.acs.org *whole document*.

* cited by examiner

METHOD OF MAKING A GRAFT COPOLYMER

BACKGROUND OF THE INVENTION

Aqueous solutions of a variety of polar aprotic polymers exhibit a lower critical solution temperature (LCST). When these solutions are heated above the LCST, the intramolecular hydrogen bonding is preferred compared to the hydrogen bonding with water molecules. This leads to collapse of the polymer coils and a precipitation of the polymer from solution. This phase transition is reversible so that the polymer redissolves when the temperature is again decreased below the LCST. A well-known example for an LCST polymer is poly(N-isopropyl acrylamide) (PNIPAM). Aqueous solutions of this polymer exhibit an LCST transition at about 33° C.

The combination of LCST polymers with elastomers offers the possibility of better control of elastomer performance in a variety of applications where the elastomer is exposed to water. Simple mixing of an LCST polymer with an elastomer results in a compound that will experience macrophase separation due to the lack of covalent bonds between the LCST polymer and the elastomer. Such a macrophase separation will most likely have a detrimental effect on compound performance.

There is therefore a need for a polymer having both elastomeric and LCST properties.

SUMMARY OF THE INVENTION

The present invention is directed to a method of making a graft copolymer, comprising the steps of:

obtaining a first polymer comprising at least one carbon-carbon double bond, the first polymer derived from at least one monomer, the at least one monomer comprising a conjugated diene monomer;

obtaining a second polymer, the second polymer capable of exhibiting a lower critical solution temperature (LCST) and comprising a terminal functional group capable of reacting with the carbon-carbon double bond;

reacting the second polymer with the first polymer to form a graft copolymer, the graft copolymer comprising a backbone derived from the first polymer and sidechains derived from the second polymer.

DETAILED DESCRIPTION

There is disclosed a method of making a graft copolymer, comprising the steps of obtaining a first polymer comprising at least one carbon-carbon double bond, the first polymer derived from at least one first monomer, the at least one first monomer comprising a conjugated diene monomer;

obtaining a second polymer, the second polymer capable of exhibiting a lower critical solution temperature (LCST) and comprising a terminal functional group capable of reacting with the carbon-carbon double bond;

reacting the second polymer with the first polymer to form a graft copolymer, the graft copolymer comprising a backbone derived from the first polymer and sidechains derived from the second polymer.

It has now been found that rubber elastomers may be functionalized with side chains of LCST polymers to produce a graft copolymer with an elastomer backbone and LCST polymer sidechains. A convenient way for the functionalization of a variety of elastomers is the thiol-ene reaction during which alkene moieties being present in the elastomers are transformed into thioethers by reaction with thiols. This reaction proceeds preferably with vinyl groups as they are present in styrene-butadiene rubbers, butadiene rubbers, and polyisoprene rubbers. In order to allow the functionalization of the elastomers, the LCST polymers may feature thiol end groups. These can be introduced by reaction of thiocarbonylthio endgroups with nucleophilic agents. Polymers exhibiting thiocarbonylthio end groups can be produced by reversible addition-fragmentation chain transfer (RAFT) polymerization. One reaction scheme describes the use of PNIPAM as LCST polymer, however, this invention is not limited to that as any LCST polymer with a reactive end group, which for example can be produced by RAFT polymerization, can be used for the functionalization of the elastomer.

One step of the method to produce the graft copolymer is to obtain, a first polymer comprising at least one carbon-carbon double bond. In one embodiment, the first polymer comprising at least one carbon-carbon double bond is a diene based elastomer. The phrases "rubber or elastomer containing olefinic unsaturation" or "diene based elastomer" as used herein are equivalent and are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic rubbers are the homopolymerization products of butadiene and its homologues and derivatives, for example, methylbutadiene (i.e., isoprene), dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

A second step of the method is obtaining a second polymer, the second polymer capable of exhibiting a lower critical solution temperature (LCST) and comprising a terminal functional group capable of reacting with the carbon-carbon double bond of the first polymer.

By "capable of exhibiting a lower critical solution temperature (LCST)," it is meant that in the presence of water, the second polymer associates with the water to form a water-swollen polymer phase, wherein the water-swollen polymer phase will show an LCST transition when heated from a temperature below the LCST to a temperature above the LCST. The second polymer is accordingly capable of exhibiting an LCST when the second polymer exists as a side chain on the graft copolymer.

Suitable second polymers include those capable of exhibiting a lower critical solution temperature. In one embodiment, the second polymer includes homopolymers and copolymers of various second monomers known to have LCST behavior, including but not limited to polymers of: acrylamides and substituted acrylamides, methacrylamides and substituted methacrylamids, acrylic acids and substituted acrylic acids, methacrylic acids and substituted methacrylic acids, vinyl alkyl ethers and substituted vinyl alkyl ethers, vinyl caprolactams and substituted vinyl caprolactams, and other monomers known to lead to polymers with LCST behavior, such as oligo(ethylene glycol) methacrylate and 2-(2-methoxyethoxy) ethyl methacrylate, and the like.

In one embodiment, the second polymer is a polymer of a second monomer of formula I where $R^1$ and $R^2$ are independently selected from the group consisting of hydrogen, C2 to C6 linear alkyl, C2 to C6 branched alkyl, and C3 to C6 cycloalkyl, with the proviso that at least one of $R^1$ and $R^2$ is not hydrogen.

In one embodiment, the second polymer is of formula (II)

where $R^1$ and $R^2$ are independently selected from the group consisting of hydrogen, C2 to C6 linear alkyl, C2 to C6 branched alkyl, and C3 to C6 cycloalkyl, with the proviso that at least one of $R^1$ and $R^2$ is not hydrogen, and m is the degree of polymerization of the hydrocarbon chain.

In one embodiment, the second polymer is a polymer of an N-substituted acrylamide derivative.

In one embodiment, the second polymer is a polymer of N-isopropylacrylamide, N-cyclopropylacrylamide, or N,N-diethylacrylamide.

The second polymer includes a terminal function group capable of reacting with a carbon-carbon double bond of the first polymer. In one embodiment, the terminal functional group is a thiol group. Such a terminal functional group may be incorporated into the second polymer during polymerization, for example, through use of a suitable chain transfer agent or terminating agent as is known in the art.

In one embodiment, the second polymer is obtained by polymerizing a second monomer in the presence of a thiocarbonylthio RAFT chain transfer agent to form a polymer comprising a terminal thiocarbonylthio group; and cleaving the terminal thiocarbonylthio group to a thiol group to form the second polymer comprising a terminal thiol group.

In one embodiment, the terminal functional group of the second polymer is incorporated in the second polymer during polymerization through the mechanism of reversible addition-fragmentation chain transfer (RAFT). More details of the RAFT polymerization mechanism may be found by reference to Moad et al., *Aust. J. Chem.* 2005, 58, 379-410. As is known in the art, RAFT polymerization of free-radical polymerizable monomers is accomplished in the presence of a thiocarbonylthio RAFT chain transfer agent of general formula (III)

(III)

where $R^3$ is a free radical leaving group able to reinitiate polymerization, and Z is a functional group that influences the rate of radical addition and fragmentation. Suitable thiocarbonylthio RAFT chain transfer agents include dithioesters, trithiocarbonates, dithiocarbamates, and xanthates. In one embodiment, the thiocarbonylthio chain transfer agent is a trithiocarbonate. In one embodiment, the thiocarbonylthio chain transfer agent is selected from the group consisting of S-1-dodecyl-S-(αα'-dimethyl-α''-acetic acid) trithiocarbonate and 4-cyano-4-dodecylsulfanylthiocarbonylsulfanyl-4-methyl butyric acid.

Upon RAFT polymerization in the presence of a suitable thiocarbonylthio chain transfer agent, the chain-terminated polymer has the general formula (IV)

(IV)

where $P_n$ represents the polymer chain exhibiting a LCST.

The chain terminated polymer of formula III is then reacted with a suitable nucleophile to cleave the C—S linkage to obtain a second polymer of formula (V) having a terminal thiol group (V)

In one embodiment, the chain terminated polymer of formula IV is treated by aminolysis to obtain the thiol-terminated polymer of formula V.

A third step of the method is reacting the second polymer with the first polymer to form a graft copolymer, the graft copolymer comprising a backbone derived from the first polymer and sidechains derived from the second polymer. During reacting of the second polymer with the first polymer, a second polymer is linked to the first polymer through reaction of a terminal functional group of the second polymer with the unsaturated carbon-carbon bond of the first polymer.

In one embodiment, the thiol-terminated second polymer is reacted with the first polymer in the presence of a free-radical initiator via a thiol-ene reaction as is known in the art, see for example *Macromolecules* 2008, 41, 9946-9947. In one embodiment, the free-radical initiator is selected from the group consisting of 2,4,6-Trimethylbenzoyldiphenylphosphine oxide and azobisisobutyonitrile (AIBN).

The reaction of the first polymer with the thiol-terminated second polymer may be carried out in solution, for example in a hydrocarbon solvent or the like. Alternatively, the reaction may be carried out in a dry mix, by combination of the first and second polymers in suitable rubber mixing equipment.

The invention is further illustrated by the following non-limiting examples.

Example 1

In this example, functionalization of a styrene-butadiene rubber with 2-mercaptonaphthaline is illustrated to demonstrate the thiol-ene reaction.

To test the reactivity and reaction conditions of the styrene-butadiene rubber in a thiol-ene reaction, some reactions with a model thiol were made. The chosen thiol was 2-mercaptonaphthaline, from Aldrich.

Figure 1:
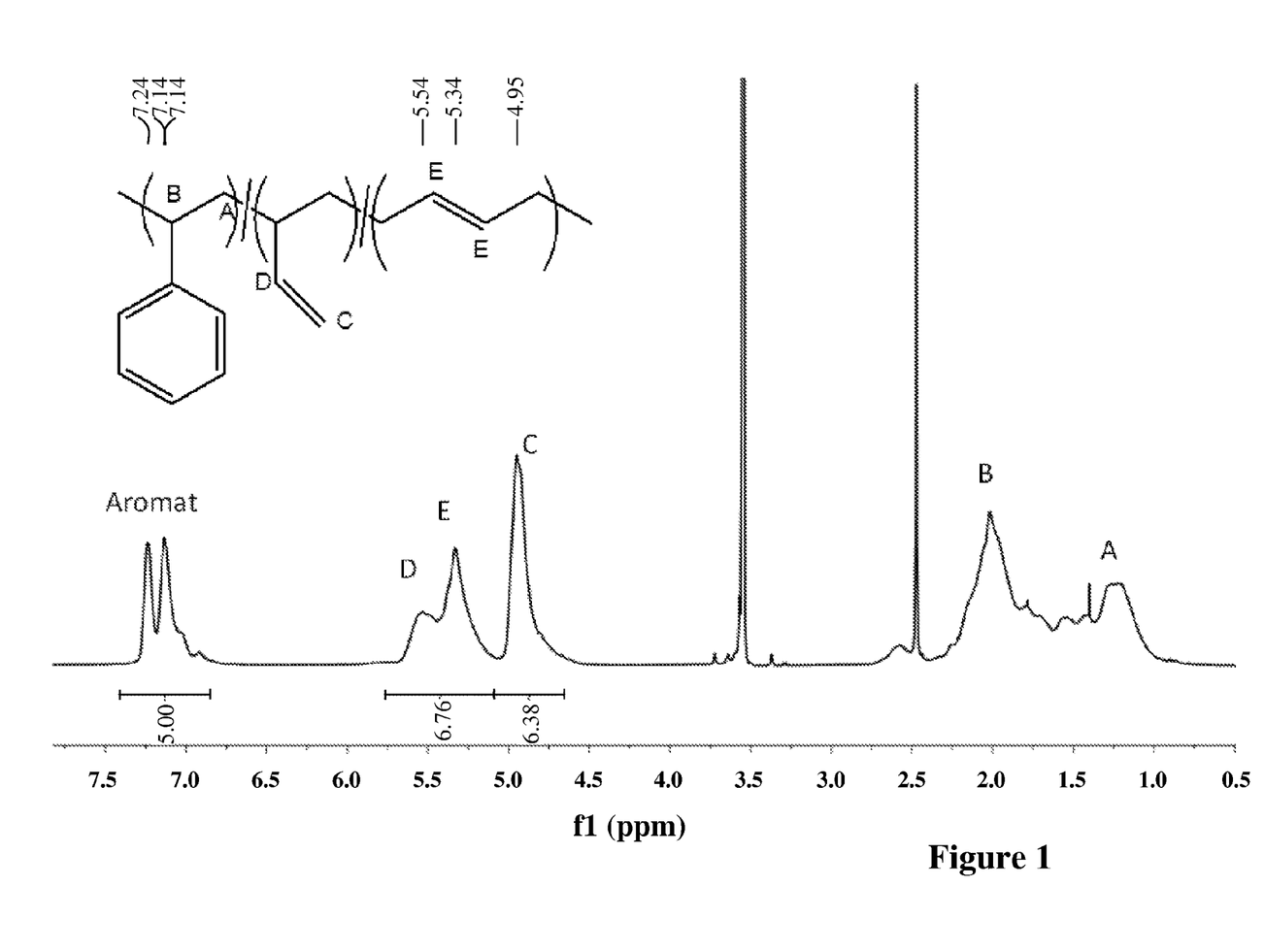
FIG. 1 shows the $^1$H-NMR spectrum of a styrene-butadiene elastomer.

The properties of the used styrene-butadiene rubber are summarized in Table 1. FIG. 1 shows the $^1$H-NMR spectrum of the elastomer.

TABLE 1

| | |
|---|---|
| Mooney (avg) | 27.6 |
| Finished Mooney | 23.1 |
| Tg (onset)/° C. | −21.74 |
| Tg (midpoint)/° C. | −17.52 |
| FTIR Styrene/% | 25.392 |
| FTIR Vinyl/% | 47.506 |
| FTIR Cis/% | 13.144 |
| FTIR Trans/% | 13.058 |
| Mn/g/mol | 124122 |
| Mw/g/mol | 207982 |
| Mz/g/mol | 327454 |
| PDI | 1.67 |

Synthesis of 2-mercaptonaphthaline Functionalized Rubber

This compound was synthesized twice, once with AIBN as initiator for the reaction and once with an acylphosphine oxide photoinitiator (Lucirin TPO).

For the reaction initiated by AIBN, 1 g of SBR was dissolved in 50 ml dry THF and 1.40 g of 2-mercaptonaphthaline and 0.14 g AIBN were added. The solution was degassed under a stream of argon for 2 hours and was then placed in a preheated oil bath at 75° C. The reaction was stirred for 14.5 hours at that temperature.

For the reaction initiated by the photoinitiator, a mixture of 1 g SBR, 1.40 g 2-mercaptonaphthaline and 0.30 g Lucirin TPO was degassed under a stream of argon for 2 hours and then was placed under a UV-lamp (320-380 nm) for 14.5 hours.

To make sure that no free thiol was present in the product, both reaction mixtures were dialyzed against THF for two days. Afterwards the solvent was evaporated and the product was dried under vacuum.

Figure 2:
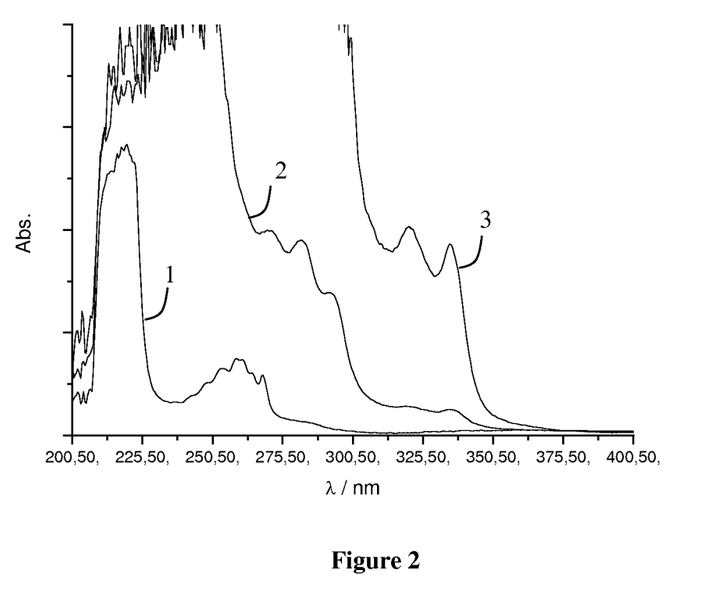
FIG. 2 shows the UV-vis spectrum of a styrene-butadiene elastomer before and after the reaction with 2-mercaptonaphtaline and the spectrum of the pure thiol.
Figure 3:
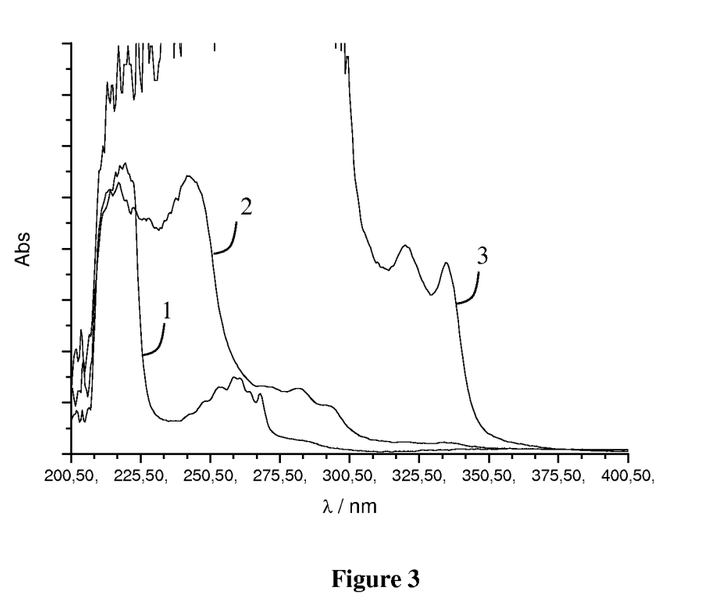
FIG. 3 shows the UV-vis spectrum of a styrene-butadiene elastomer before and after the reaction with 2-mercaptonaphtaline and the spectrum of the pure thiol.

FIG. 2 shows the UV-vis spectrum of the elastomer before (1) and after the reaction with 2-mercaptonaphtaline (2) and the spectrum of the pure thiol (3). Here the photoinitiator was used. FIG. 3 shows the same for the reaction which was initiated by AIBN, with the UV-vis spectrum of the elastomer before (1) and after the reaction with 2-mercaptonaphthanline (2) and the spectrum of the pure thiol (3).

Figure 4:
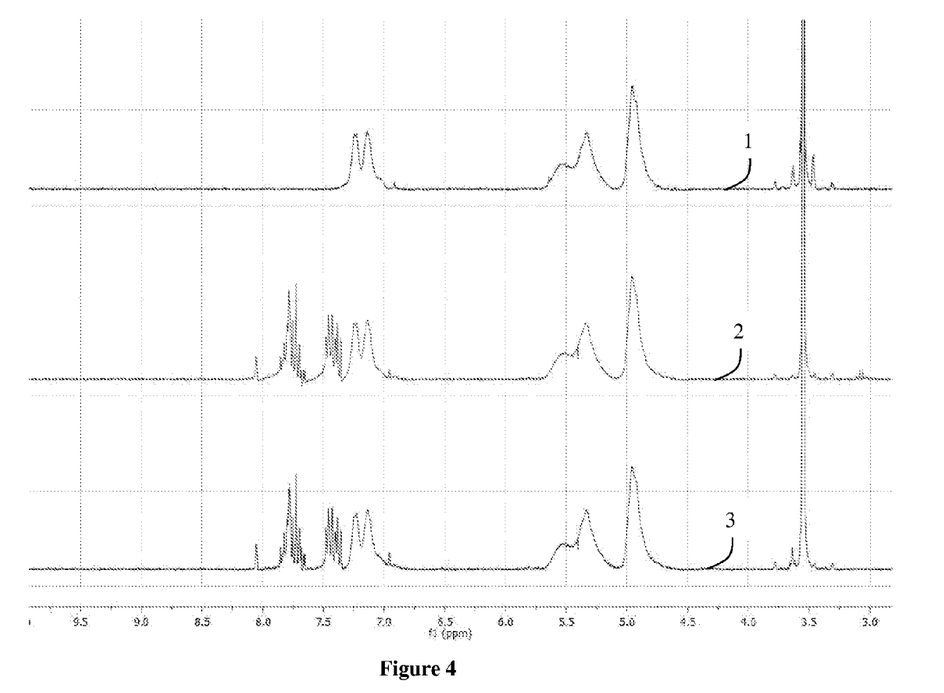
FIG. 4 shows the $^1$-HNMR spectrum of a styrene-butadiene elastomer before and after reaction with a thiol in the presence of different initiators.
Figure 5:
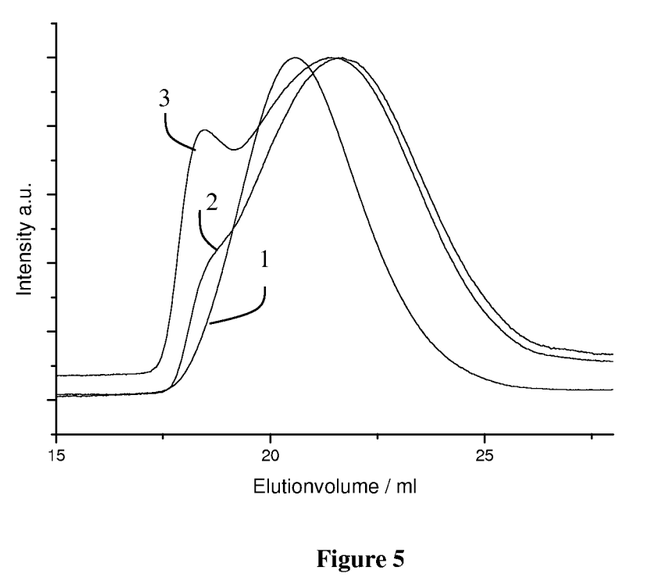
FIG. 5 shows a GPC-measurement for a styrene-butadiene elastomer, and the elastomer functionalized with a thiol in the presence of different initiators.

FIG. 4 shows the $^1$H-NMR spectrum of the elastomer before (1) and after reaction with the thiol in the presence of AIBN (2) and Lucirin (3). Compared to the $^1$H-NMR spectrum of the unfunctionalized rubber, there is an increase of the signals for the aromatic protons and a decrease for the vinyl groups after the polymer analogous reaction, confirming that the SBR was successfully functionalized with 2-Mercaptonaphtaline. GPC-measurement (in THF) as shown in FIG. 5 for the SBR (1), the SBR functionalized in the presence of AIBN (2) and in the presence of Lucirin (3) confirmed that the product is not greatly cross linked. As seen in FIG. 5, especially the curve of the AIBN-initiated product (2) shows very little cross linking (small shoulder), so that the decrease of the signal of vinyl protons can be assigned to functionalization.

Example 2

In this example, preparation of poly-(N-isopropylacrylamide), or PNIPAM, is illustrated.

RAFT-polymerization was used for the preparation of PNIPAM. For this purpose two alternative chain transfer agents (CTA) were prepared: S-1-Dodecyl-S-(αα'-dimethyl-α''-aceticacid)trithiocarbonate (DMP) and 4-Cyano-4-dodecylsulfanylthiocarbonylsulfanyl-4-methyl butyric acid (CDSMB).

The RAFT reaction scheme is as follows:

Synthesis of Chain Transfer Agents

S-1-Dodecyl-S-(αα'-dimethyl-α''-acetic acid)trithiocarbonate (DMP)

S-1-Dodecyl-S-(αα'-dimethyl-α''-acetic acid)trithiocarbonate was synthesized using literature procedure. [J. T. Lai, D. Filla, R. Shea, *Macromolecules* 2002, 35, 6754.]
Yield: 41%
$^1$H-NMR (CDCl$_3$/300 MHz): δ[ppm]: 0.85 (t, 3H), 1.16-1.47 (m, 20H), 1.71 (s, 6H), 3.26 (t, 2H), 13.05 (s, 1H)

4-Cyano-4-dodecylsulfanylthiocarbonylsulfanyl-4-methyl butyric acid (CDSMB)

4-Cyano-4-dodecylsulfanylthiocarbonylsulfanyl-4-methyl butyric acid was synthesized in two steps. The first step was prepared using literature procedure [W. G. Weber, J. B. McLeary, R. D. Sanderson, *Tetrahedron Lett.* 2006, 47, 4771.].

Step 1: Bis-(dodecylsulfanylthiocarbonyl)disulfide

Yield: 72%
$^1$H-NMR (CDCl$_3$/300 MHz): δ[ppm]: 0.86 (t, 6H); 1.11-1.43 (m, 36H); 1.65 (q, 4H); 2.66 (t, 4H)

Step 2: 4-Cyano-4-dodecylsulfanylthiocarbonylsulfanyl-4-methyl butyric acid 10 g of Bis-(dodecylsulfanylthiocarbonyl)disulfide and 7.7 g of 4,4'-azobis(4-cyano)pentaneacid were dissolved in 60 ml of freshly distilled dioxane. The mixture was degassed under a stream of argon for one hour and heated at 80° C. under argon atmosphere for 21 hours. The solvent was evaporated and the resulting dark orange oil was recrystallized from hexanes twice.
Yield: 52%
$^1$H-NMR (CDCl$_3$/300 MHz): δ[ppm]: 0.87 (t, 3H); 1.12-1.45 (m, 18H); 1.68 (q, 2H); 1.87 (s, 3H); 2.30-2.63 (m, 2H), 2.68 (t, 2H); 3.32 (t, 2H)

Synthesis of PNIPAM-CTA

All NIPAM-polymers were prepared in a Schlenk tube containing N-isopropyacrylamide, CTA, AIBN and dry dioxane as a solvent. The exact amount of all components can be obtained from Table 2. After three freeze-pump thaw cycles the mixture was placed in a preheated oil bath at 80° C. for 20 hours. The mixture was precipitated in hexane (poor solvent)/THF (good solvent) three times and dried under vacuum. Table 2 further shows the amount of used NIPAM (N-isopropylacrylamide) monomer, CTA (DMP or CDSMB), AIBN and dioxane. The yield refers to the amount of monomer used. Molecular weights were measured by GPC in DMF using PMMA as calibration.

TABLE 2

| Sample | NIPAM/ mmol | DMP/ mmol | CDSMB/ mmol | AIBN/ mmol | Dioxane/ ml | Yield/ % | M (calc.)/ (g/mol) | M(GPC)/ (g/mol) | PDI |
|---|---|---|---|---|---|---|---|---|---|
| PNI 1 | 8.8 | 0.44 | 0 | 0.04 | 6 | 94 | 2263 | 1461 | 1.13 |
| PNI 2 | 8.8 | 0.29 | 0 | 0.03 | 6 | 98 | 3395 | 3008 | 1.16 |
| PNI 3 | 8.8 | 0.18 | 0 | 0.02 | 6 | 94 | 5658 | 3251 | 1.14 |
| PNI 4 | 8.8 | 0 | 0.18 | 0.02 | 6 | 96 | 5658 | 4727 | 1.17 |
| PNI 5 | 8.8 | 0 | 0.10 | 0.01 | 6 | 89 | 10184 | 6096 | 1.18 |
| PNI 6 | 8.8 | 0 | 0.18 | 0.02 | 6 | 98 | 5658 | 4723 | 1.16 |

TABLE 2-continued

| Sample | NIPAM/ mmol | DMP/ mmol | CDSMB/ mmol | AIBN/ mmol | Dioxane/ ml | Yield/ % | M (calc.)/ (g/mol) | M(GPC)/ (g/mol) | PDI |
|---|---|---|---|---|---|---|---|---|---|
| PNI 7 | 8.8 | 0 | 0.09 | 0.01 | 6 | 96 | 11316 | 5905 | 1.13 |
| PNI 8 | 17.7 | 0 | 0.29 | 0.03 | 8 | 96 | 6790 | 5749 | 1.19 |
| PNI 9 | 17.7 | 0 | 0.25 | 0.03 | 8 | 92 | 7921 | 5202 | 1.17 |
| PNI 10 | 17.7 | 0 | 0.20 | 0.02 | 8 | 93 | 10184 | 6785 | 1.37 |
| PNI 11 | 17.7 | 0 | 0.59 | 0.06 | 8 | 99 | 3395 | 3055 | 1.14 |

The CDSMB proved more effective as shown in Table 3. Three polymers were synthesized to have the same calculated molecular weight, one with DMP and two with 4-Cyano-4-dodecylsulfanylthiocarbonylsulfanyl-4-methyl butyric acid. The discrepancy from the calculated molecular weight of the polymer and the weight measured by GPC in DMF is smaller for the CDSMB. Also the reproducibility was very good for the reaction with 4-Cyano-4-dodecylsulfanylthiocarbonylsulfanyl-4-methyl butyric acid. Consequently CDSMB was used further on for the polymerization of NIPAM.

TABLE 3

| Sample | M (calc.)/ (g/mol) | M(GPC)/ (g/mol) | PDI | M (calc) − M(GPC)/ (g/mol) | CTA |
|---|---|---|---|---|---|
| PNI 3 | 5658 | 3251 | 1.13 | 2407 | DMP |
| PNI 4 | 5658 | 4727 | 1.17 | 931 | CDSMB |
| PNI 6 | 5658 | 4723 | 1.16 | 935 | CDSMB |

The cleavage of the trithiocarbonate end group was done by aminolysis. The aminolysis was performed by stirring a mixture of PNIPAM-CTA, tributyphosphine and amine in THF for several hours at room temperature. The transformation to the thiol-group was tested with two amines: ethanolamine and hexylamine.

Kinetic measurements by UV-vis spectroscopy confirmed the completeness of the reaction after one hour. The spectrum was measured every 15 minutes after adding the amine to the solution of the polymer.

Figure 6:
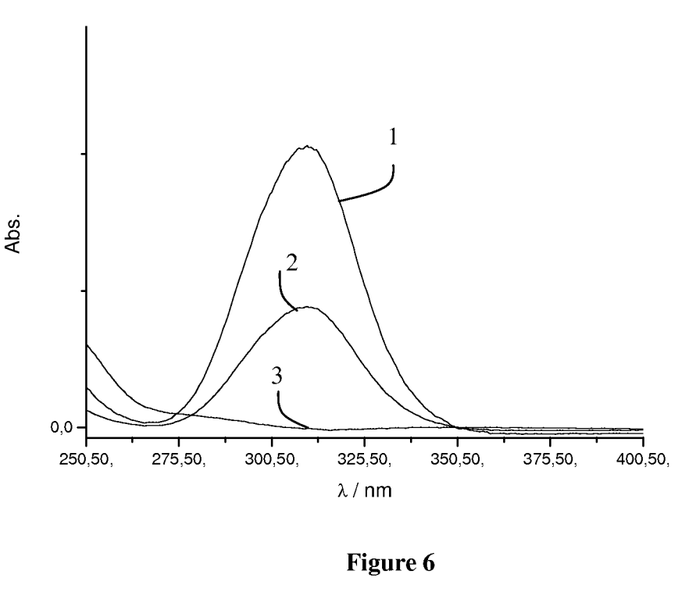
FIG. 6 shows UV-VIS spectra of a trithiocarbonate RAFT chain transfer agent, PNIPAM with a trithiocarbonate-end group and PNIPAM with a thiol group.

The cleavage of the trithiocarbonate-group was confirmed by UV-vis spectroscopy for both amines by absence of the absorption band at 310 nm (C=S). For further studies hexylamine was chosen for the cleavage because of its good solubility in hexane, which was used to precipitate the polymer after the reaction. FIG. 6 compares the spectra of the pure CTA (1), and PNIPAM with trithiocarbonate-end group (2) and SH-end group (3), at which the decrease and loss the absorption band of the trithiocarbonate group is shown.

Figure 7:
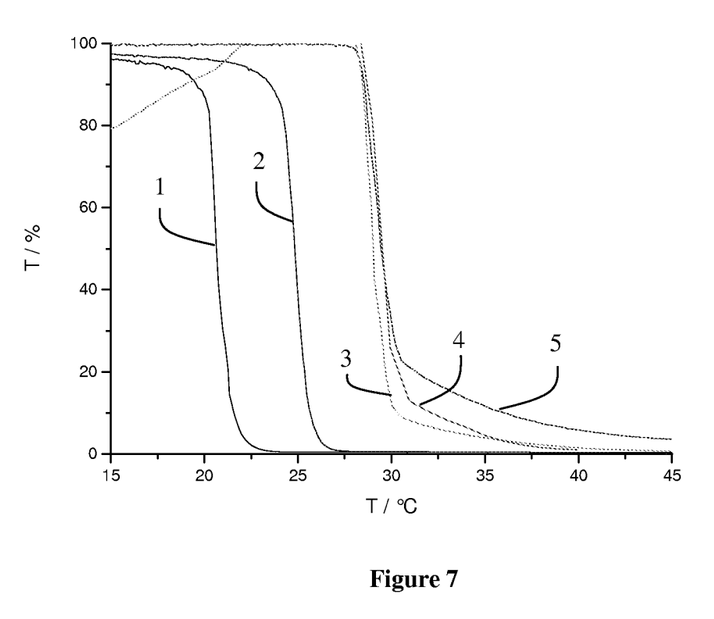
FIG. 7 shows transmission measurement of turbidity versus temperature for several PNIPAM polymers with CTA endgroups.

LCST of the RAFT-synthesized PNIPAM was determined by measurement of temperature dependant turbidity of poly-(N-isopropylacrylamide) in water at 632 nm using UV-vis spectroscopy. The solutions had a concentration of 5 mg/ml. The LCST was defined as the temperature at 50% transmission. As is known the LCST depends on the end group and the molecular weight of the polymer. Very short polymers have a lower LCST because of the influence of hydrophobic end groups on the LCST. The influence of the hydrophobic groups on the LCST diminishes for longer polymer chains. This can be seen for some of the polymers with a hydrophobic CTA endgroup of Table 2 as seen in FIG. 7, where sample PNI1 (1) having a relatively low molecular weight exhibits a LCST of 20.6° C., which is about 11° C. lower than the LCST of the higher molecular weight samples PNI6 (3), PNI10 (4), and PNI4 (5) which was detected at about 31° C. Sample PNI2 (2) showed an intermediate value for LCST.

Example 3

In this example, functionalization of a styrene-butadiene rubber with PNIPAM is illustrated.

Synthesis of Functionalized Rubber Elastomers

Functionalized elastomer was produced using the following general procedure: A solution of SBR, AIBN and the thiol in dry THF was degassed under argon atmosphere at room temperature for 2 hours. The exact amount of educts for each reaction is shown in Table 4. The reaction mixture was then placed in a preheated oil bath at 70° C. for at least 20 hours. To make sure that no free thiol was in the reaction product, the product was dialyzed against THF for three days. After the dialysis the solvent was evaporated and the product was dried under vacuum. The results of the elemental analysis of three functionalized elastomers are shown in Table 5, with the calculated weight percent of PNIPAM in the resulting functionalized SBR.

Figure 8:
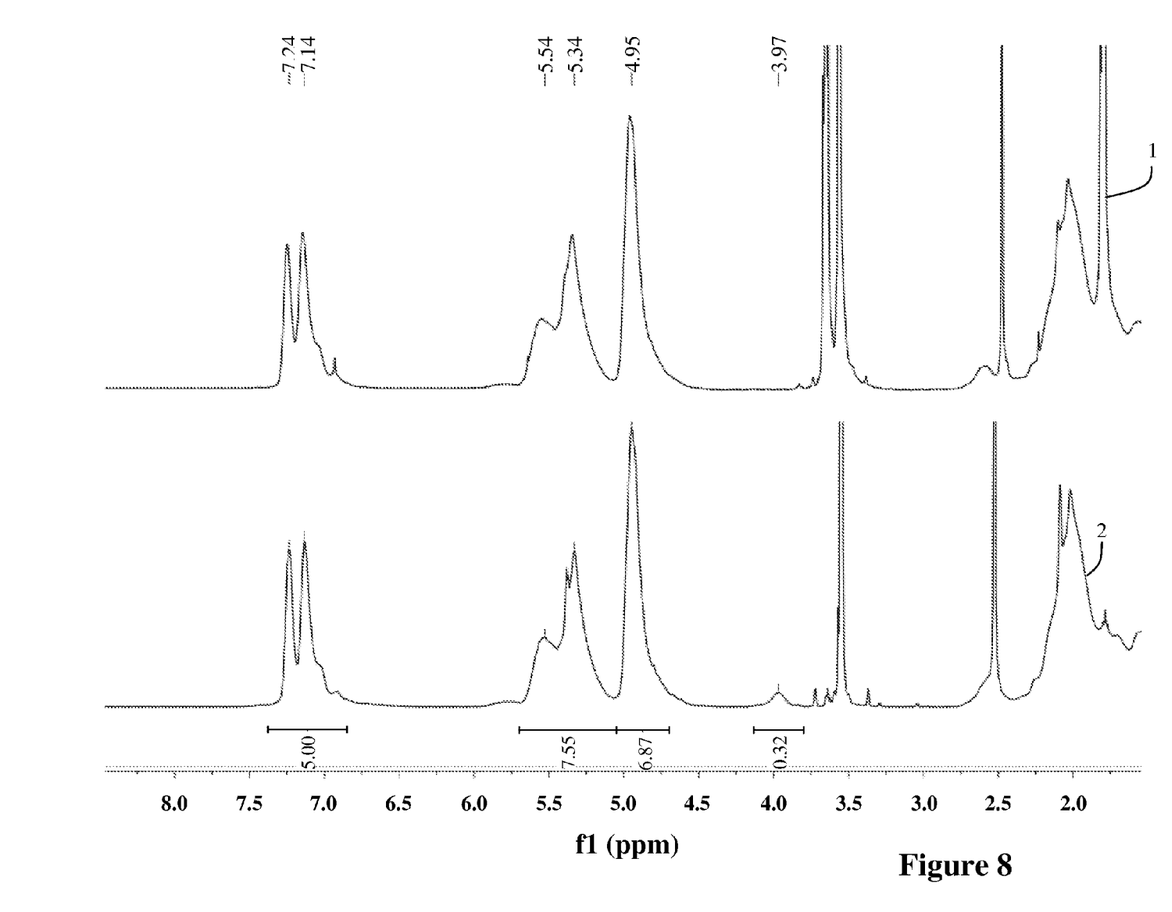
FIG. 8 shows the $^1$H-NMR spectrum of a styrene-butadiene elastomer and of a styrene-butadiene elastomer functionalized with PNIPAM.
Figure 9:
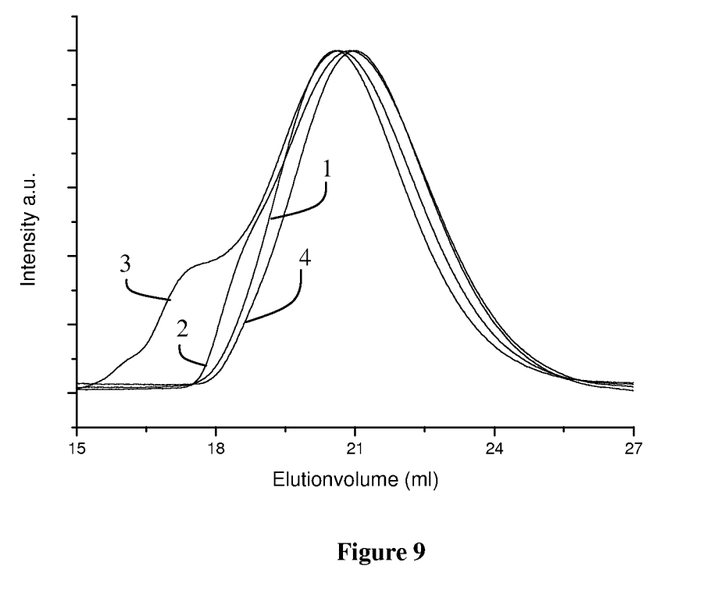
FIG. 9 shows GPC curves for a styrene-butadiene elastomer and for three PNIPAM-functionalized styrene-butadiene elastomers.

The $^1$H-NMR spectrum of the SBR (1) and of the functionalized rubber (2) are shown in FIG. 8. As seen in FIG. 8, the typical elastomer signals are observable, but also the peak of the CH-group of the isopropyl-group of PNIPAM at 3.97 ppm. Again a decrease of the vinyl signals can be observed, indicating a successful functionalization. GPC measurements indicated little cross linking if any of all samples as seen in FIG. 9. FIG. 9 shows exemplary GPC curves for the SBR (1) and for three functionalized elastomers SBR2 (2), SBR5 (3) and SBR6 (4). As indicated by the presence of the shoulder at about 16-17 ml elution volume in FIG. 9, SBR6 showed no cross linking during the reaction, SBR2 showed very little cross linking and SBR 5 shows some cross linking. All three samples were soluble, indicating they were not greatly cross linked.

TABLE 4

| Sample | weight PNIPAM/ (SBR) | PNIPAM used [1] | mass SBR/ g | mass AIBN/ g | mass thiol/ g | M (PNIPAM-SH)/(g/mol) |
|---|---|---|---|---|---|---|
| SBR 1 | 20 | PNI6 | 1.0 | 0.027 | 0.20 | 4723 |
| SBR 2 | 20 | PNI7 | 1.0 | 0.027 | 0.20 | 5950 |
| SBR 3 | 10 | PNI8 | 1.0 | 0.022 | 0.10 | 5749 |
| SBR 4 | 15 | PNI8 | 1.0 | 0.023 | 0.15 | 5749 |
| SBR 5 | 5 | PNI8 | 1.0 | 0.020 | 0.05 | 5749 |
| SBR 6 | 25 | PNI3 | 1.0 | 0.003 | 0.25 | 3395 |
| SBR 7 | 200 | PNI2 | 0.5 | 0.001 | 1.17 | 3008 |

[1] from Example 2

TABLE 5

| Sample | SBR | SBR 3 | SBR 4 | SBR 5 |
|---|---|---|---|---|
| Measurement 1 C/% | 3.753 mg 89.72 | 6.968 mg 86.95 | 3.472 mg 85.05 | 1.344 mg 88.21 |

TABLE 5-continued

| Sample | SBR | SBR 3 | SBR 4 | SBR 5 |
|---|---|---|---|---|
| H/% | 10.50 | 10.20 | 10.14 | 8.87 |
| N/% | 0 | 1.03 | 1.29 | 0.42 |
| S/% | 0 | 0.08 | 0.29 | 0.32 |
| PNIPAM in SBR/wt % | | 8.32 | 10.42 | 3.39 |
| Measurement 2 | 4.882 mg | 2.812 mg | 5.129 mg | 1.164 mg |
| C/% | 89.75 | 86.81 | 85.03 | 87.92 |
| H/% | 10.48 | 10.50 | 10.17 | 9.07 |
| N/% | 0 | 1.01 | 1.30 | 0.35 |
| S/% | 0 | 0.12 | 0.12 | 0.30 |
| PNIPAM in SBR/wt % | | 8.16 | 10.50 | 2.83 |

Example 5

In this example, the effect of PNIPAM-functionalization on the wettability of a styrene-butadiene rubber is illustrated. Wettability of the functionalized SBR was determined by measuring the contact angle of water droplets on a glass plate coated with the functionalized polymer.

Contact angle was measured following the procedure. The functionalized SBR samples were dissolved in THF and spin-coated on a glass slide. After drying in vacuum the slides were placed under a needle and a water droplet was purged out of the needle onto the coated glass. The contact angle was determined by measurement of the inner angle between the droplet and the glass surface. Contact angle was measured for each of the series of functionalized SBR at two temperatures, 22° C. and 45° C. These temperatures were chosen as being well below and above the 32° C. LCST for PNIPAM. The samples used corresponded to SBR3, SBR4, SBR5 and SBR2.

Figure 10:
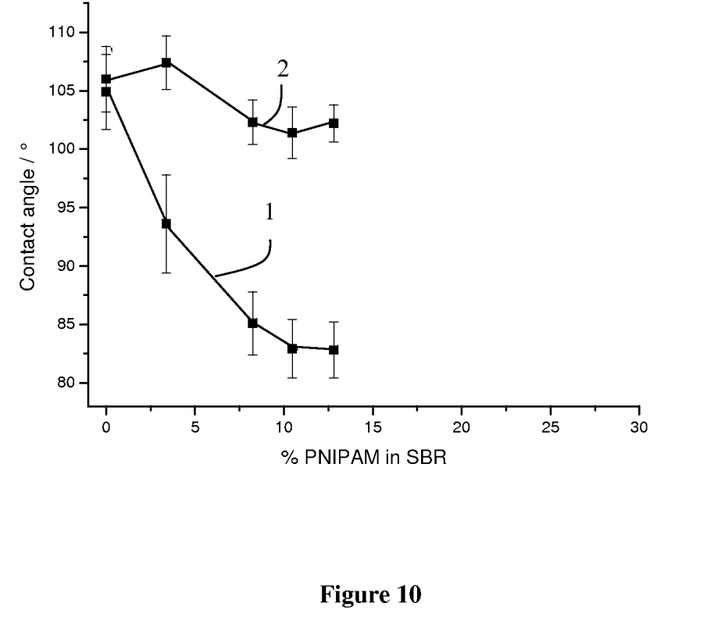
FIG. 10 shows contact angle as a function of PNIPAM content of PNIPAM functionalized styrene-butadiene elastomer.
Figure 11:
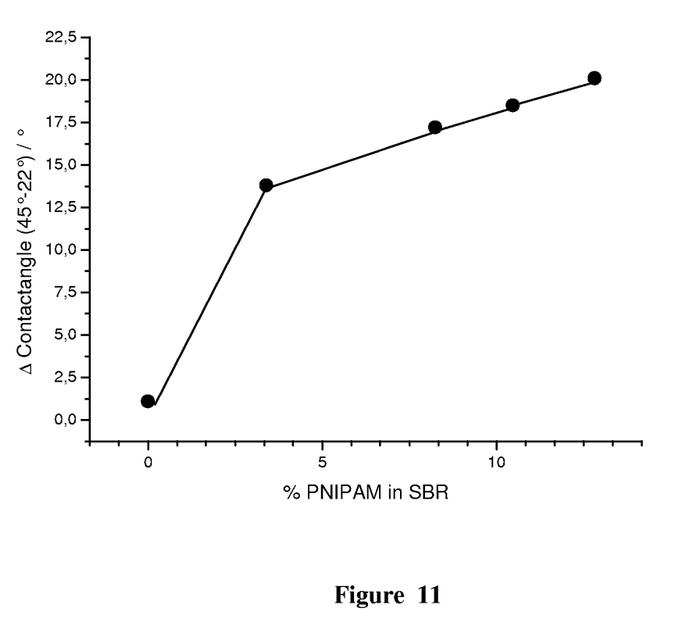
FIG. 11 shows the relative difference in contact angle above and below the LCST for PNIPAM functionalized styrene-butadiene elastomer.

FIG. 10 shows the measured contact angle as a function of PNIPAM content at each of the two temperatures 22° C. (1) and 45° C. (2). As seen in FIG. 10, the contact angle for the samples measured below the LCST at 22° C. showed a significant decrease in contact angle as the amount of PNIPAM in the polymer was increased, indicating that the functionalized polymer becomes relatively hydrophilic below the LCST. The contact angle for samples measured above the LCST at 45° C. by comparison was relatively constant, indicating that the functionalized polymer is relatively hydrophobic above the LCST. The relative difference in contact angle above and below the LCST is shown in FIG. 11, illustrating the strong increase of hydrophilic behavior with increasing PNIPAM content of the functionalized SBR.

What is claimed is:

1. A method of making a graft copolymer, comprising the steps of
obtaining a first polymer comprising at least one carbon-carbon double bond, the first polymer derived from at least one first monomer, the at least one first monomer comprising a conjugated diene monomer and styrene;
obtaining a second polymer, the second polymer capable of exhibiting a lower critical solution temperature (LCST) and comprising a terminal functional group capable of reacting with the carbon-carbon double bond;
reacting the second polymer with the first polymer to form a graft copolymer, the graft copolymer comprising a backbone derived from the first polymer and sidechains derived from the second polymer.

2. The method of claim 1, wherein during reacting of the second polymer with the first polymer, the second polymer is linked to the first polymer through reaction of the terminal functional group with the unsaturated carbon-carbon bond.

3. The method of claim 1, wherein the terminal functional group is a thiol group.

4. The method of claim 3, wherein the step of obtain a second polymer comprises the steps of:
polymerizing a second monomer in the presence of a thiocarbonylthio RAFT chain transfer agent to form a polymer comprising a terminal thiocarbonylthio group; and
cleaving the terminal thiocarbonylthio group to a thiol group to form the second polymer comprising a terminal thiol group.

5. The method of claim 4, wherein the second monomer is an N-substituted acrylamide derivative.

6. The method of claim 4, wherein the second monomer is of formula where $R^1$ and $R^2$ are independent selected from the group consisting of hydrogen, C2 to C6 linear alkyl, C2 to C6 branched alkyl, and C3 to C6 cycloalkyl, with the proviso that at least one of $R^1$ and $R^2$ is not hydrogen.

7. The method of claim 4, wherein the second monomer is selected from the group consisting of N-isopropylacrylamide, N-cyclopropylacrylamide, and N, N-diethylacrylamide.

8. The method of claim 4, wherein the thiocarbonylthio RAFT agent is selected from the group consisting of trithiocarbonate RAFT agents, dithioester RAFT agents, xanthate RAFT agents, and dithiocarbamate RAFT agents.

9. The method of claim 4, wherein the thiocarbonylthio RAFT chain transfer agent is selected from the group consisting of S-1-dodecyl-S-(αα'-dimethyl-α"-acetic acid) trithiocarbonate, and 4-cyano-4-dodecylsulfanylthiocarbonylsulfanyl-4-methyl butyric acid.

10. The method of claim 4, wherein the terminal thiocarbonylthio group is cleaved by aminolysis.

11. The method of claim 1, wherein the second polymer is a polymer of a N-substituted acrylamide derivative.

12. The method of claim 1, wherein the second polymer is of formula where $R^1$ and $R^2$ are independently selected from the group consisting of hydrogen, C2 to C6 linear alkyl, C2 to C6 branched alkyl, and C3 to C6 cycloalkyl, with the proviso that at least one of $R^1$ and $R^2$ is not hydrogen, and m is the degree of polymerization of the hydrocarbon chain.

13. The method of claim 1, wherein the conjugated diene monomer is selected from the group consisting of butadiene, and isoprene.

14. The method of claim 1, wherein the step of reacting the second polymer with the first polymer is conducted in the presence of a free-radical initiator.

15. The method of claim 14, wherein the free-radical initiator is selected from the group consisting of 2,4,6-trimethylbenzoyldiphenylphosphine oxide and azobisisobutyronitrile.

* * * * *